United States Patent
Liu et al.

(10) Patent No.: US 10,597,549 B2
(45) Date of Patent: Mar. 24, 2020

(54) COATING COMPOSITION FOR GLOSSY INK RECEPTIVE MEDIA

(71) Applicant: Lubrizol Advanced Materials, Inc., Cleveland, OH (US)

(72) Inventors: Xiang Liu, Solon, OH (US); Alexander V. Lubnin, Copley, OH (US)

(*) Notice: Subject to any disclaimer, the term of this patent is extended or adjusted under 35 U.S.C. 154(b) by 0 days.

(21) Appl. No.: 16/322,413

(22) PCT Filed: Jul. 31, 2017

(86) PCT No.: PCT/US2017/044701
§ 371 (c)(1),
(2) Date: Jan. 31, 2019

(87) PCT Pub. No.: WO2018/026718
PCT Pub. Date: Feb. 8, 2018

(65) Prior Publication Data
US 2019/0194485 A1    Jun. 27, 2019

Related U.S. Application Data

(60) Provisional application No. 62/369,233, filed on Aug. 1, 2016.

(51) Int. Cl.
| | | |
|---|---|---|
| *C09D 11/54* | (2014.01) | |
| *C08G 18/48* | (2006.01) | |
| *C09D 133/08* | (2006.01) | |
| *C08G 18/08* | (2006.01) | |
| *C08G 18/75* | (2006.01) | |
| *C09D 133/12* | (2006.01) | |
| *B41M 5/52* | (2006.01) | |
| *C08L 75/08* | (2006.01) | |
| *C08G 18/32* | (2006.01) | |
| *C08G 18/66* | (2006.01) | |
| *C09D 133/04* | (2006.01) | |
| *C09D 133/02* | (2006.01) | |
| *C09D 175/08* | (2006.01) | |
| *B41J 11/00* | (2006.01) | |
| *C09D 11/033* | (2014.01) | |
| *C09D 11/30* | (2014.01) | |

(52) U.S. Cl.
CPC ............. *C09D 11/54* (2013.01); *B41J 11/002* (2013.01); *B41M 5/52* (2013.01); *C08G 18/0823* (2013.01); *C08G 18/3206* (2013.01); *C08G 18/4833* (2013.01); *C08G 18/6681* (2013.01); *C08G 18/758* (2013.01); *C08L 75/08* (2013.01); *C09D 11/033* (2013.01); *C09D 11/30* (2013.01); *C09D 133/02* (2013.01); *C09D 133/04* (2013.01); *C09D 133/08* (2013.01); *C09D 133/12* (2013.01); *C09D 175/08* (2013.01); *B41M 5/5254* (2013.01); *B41M 5/5281* (2013.01)

(58) Field of Classification Search
CPC .... C09D 11/54; C09D 175/08; C09D 133/02; C09D 133/04; C09D 133/12; C09D 133/08; C09D 11/30; C09D 11/033; C08G 18/6681; C08G 18/3206; C08G 18/758; C08G 18/0823; C08G 18/4833; C08L 75/08; B41J 11/002; B41M 5/5254; B41M 5/5281
See application file for complete search history.

(56) References Cited

U.S. PATENT DOCUMENTS

| | | | |
|---|---|---|---|
| 2008/0081160 A1 | 4/2008 | Anderle et al. | |
| 2011/0318510 A1 | 12/2011 | Seguchi et al. | |
| 2017/0349774 A1* | 12/2017 | Shimono | C09D 11/107 |
| 2018/0273789 A1* | 9/2018 | Matsuzaki | B41J 11/0015 |
| 2018/0361759 A1* | 12/2018 | Milini | B41J 3/4078 |

FOREIGN PATENT DOCUMENTS

WO    2018026718 A1    2/2018

OTHER PUBLICATIONS

Written Opinion and Search Report of corresponding International Application No. PCT/US2017/044701 dated Sep. 22, 2017.

* cited by examiner

*Primary Examiner* — Henok D Legesse
(74) *Attorney, Agent, or Firm* — Vincetn Cortese; Samuel Laferty

(57) ABSTRACT

The present invention provides a blend of a soft water reducible polyurethane with a high percentage of tethered ethylene oxide rich chains and a harder acrylic copolymer with specified percentages of repeat units from C1-C12 esters of acrylic and/or methacrylic acid and an acid component from combined acrylic and methacrylic acid. The blend forms the binder in a coating that exhibits the possibilities of having high gloss, transparency, and facilitating the conversion of inks applied to the coating to a smudge resistant image in a short period of time after application of the ink.

12 Claims, No Drawings

COATING COMPOSITION FOR GLOSSY INK RECEPTIVE MEDIA

CROSS REFERENCE TO RELATED APPLICATION

This application claims priority from PCT Application No. PCT/US2017/044701 filed Jul. 31, 2017, which claims the benefit of U.S. Provisional Application No. 62/369,233 filed Aug. 1, 2016.

FIELD OF THE INVENTION

The coating composition that results in a glossy ink receptive media is useful to prepare a coated surface for a variety of potential printing uses where a relatively high gloss image may be desirable. Digital and ink jet application of the ink is one anticipated printing method to be used to apply images and/or text onto the ink receptive coating composition. Water based inks are preferred for use with the coating. Use with pigmented inks is anticipated. Use with dye based inks is also possible. The dried coating has high affinity to water and solvents (e.g., humectants, coalescents, etc.) so the water and/or solvents in the ink can be absorbed to facilitate faster drying and faster development of smudge resistance of the printed image. The dried coating and image desirably have good wet rub resistance so the coating can be used in labels that are legible after being immersed in water and subjected to contact against moving surfaces while wet. Surprisingly the mixture of these two very hydrophilic polymers gave a water resistant film.

BACKGROUND OF THE INVENTION

Ink receptive coatings for water-based ink jet printing are known and generally involve highly absorbent particulates like precipitated silica.

A problem with ink receptive coatings containing silica and other highly absorptive inorganic particulates is that they tend to cause rough, low-gloss coating surfaces. Silicas are one of the primary flatting agents to create low-gloss (matted) coatings and finishes.

Another problem with digitally printed images obtained with water-based inks on receptive coatings is wet abrasion resistance. Typically, things that interact well with water and other polar solvents, swell and soften in the presence of water and polar solvents. Ink images, especially on the surface of a coating rather than absorbed into the coating, tend to abrade faster from softer swollen coatings than from hard non-swollen coatings. Thus, technologies to make a coating ink receptive and fast drying tend to also make the images on the coating more subject to quick abrasive wear and losses in image quality and legibility.

U.S. Pat. No. 8,440,273 on coating composition for forming a glossy inkjet receptive coating on a substrate relates to a coating on a substrate having a cationic polymer and a colloidal silica.

WO02/068191A1 to inkjet printable waterslide transferable media relates to an ink receptive structure that can be printed and then facilitate the transfer of the printed image on the substrate to another object.

U.S. Pat. No. 6,897,281 B2 relates to a breathable polyurethanes, blends, and articles therefrom. The polyurethanes are different because they have poly(ethylene oxide) rich side chains that help moisture vapor permeability.

SUMMARY OF THE INVENTION

The present invention provides a blend of a water reducible polyurethane in an aqueous media and an aqueous acrylic copolymer dispersion of at least an alkyl acrylate and combined acrylic and methacrylic acid and as the principal components of an ink receptive coating or film. It also relates to the use of the blend converted to a film by drying as a potentially high gloss ink receptive coating for various substrates. The ink receptive coating would have good printability and result in high resolution images with relatively rapid drying times such that images would need minimal dry time before they could be handled, packaged and put into inventory and/or used without significant smudging of the image. It also relates to a printed article (potentially high gloss) having an image printed on an ink receptive coating as described above. Said image would have good wet rub resistance when most of the ink fluid have evaporated (ink fluid is the water and solvents). It also relates to a method of putting together the ink receptive coating, applying to a substrate, and/or printing on the ink receptive coating to form image and/or text with a low propensity towards smudging shortly after printing.

DETAILED DESCRIPTION OF THE INVENTION

This invention relates to a blend of at least two polymers to result in a polymer composition that can be used as an ink receptive media (such as a film or coating) for various printing processes. A benefit of this composition over prior art compositions is that it can be a very high gloss coating or film since it doesn't require a porous high absorbency filler which tends to reduce gloss. High absorbency fillers are generally useful in an ink receptive coating as the fillers can absorb water and low molecular weight polar organic solvents out of the ink composition and thereby thicken or coagulate the ink on the surface of the media (e.g., coating or film) preventing migration of the ink along the printed surface and/or minimizing smudging of the ink because it is closer to a fully coalesced film.

The coating composition is able to reduce the need or desirability of high absorbency filler because the at least two polymers used each has significant absorbency of either water and/or organic solvents. The polymers are unique because even though they have high absorbency of water and/or organic solvents, the polymers in the final ink receptive media (e.g., film or coating) do not swell to a large enough extent in water or organic solvents that it reduces the wet rub resistance of the ink receptive coating or delaminates from a substrate. It is desirable that printed images on ink receptive coatings/films have good wet (water) rub resistance, as exposure to water is common occurrence to many printed images.

High absorbency fillers (such as silica or cationic silica) share the ability to absorb high amounts of water or low molecular weight organic solvents with the two polymers described below. High absorbency fillers also do not significantly soften the coating or film when saturated with water or organic solvents and hence can positively contribute to wet rub resistance. However, as described above high absorbency silicas tend to reduce gloss in coatings and films. High absorbency fillers also tend to reduce transparency of ink receptive media. The current ink receptive media can be formulated without fillers and can have a high degree of transparency.

The coating or film composition is going to be described as primarily a binder system composed of at least a water reducible polyurethane and an aqueous acrylic copolymer dispersion of specific composition. The binder system can include optional polymers up to 10 or 20 wt. % of the binder composition. The coating or film may also contain particulate material (although this isn't required in all embodiments), surfactants, dispersants, wetting agents, surface modifiers, biocides and other preservatives, and other additives common to coatings and films. The binder composition can comprise from about 20 to about 100 wt. % of the dry ink receptive film or coating. Thus, the binder can be up to 100% of the material forming the final film. Typically, any particulate, such as filler, pigment, or functional particulate (if present) would be the other major component of the film or coating. Generally, particulate material includes fillers, pigments, and other solids that have number average particles sizes such as determined by dynamic light scattering measurements using intensity averaging and gaussian distributions of in excess of 10 or 20 nanometer and less than 20 microns. The other various additives (such as surfactants) are typically less than 10 wt. % of the final film or coating.

The two main polymers of the binder are the water reducible polyurethane and the acrylic copolymer from the aqueous dispersion. The optional polymers might be any conventional polymers in coatings and would include polar polymers such as poly(vinyl alcohol), poly(vinyl pyrrolidone), polyinylpiperidone, poly(N-vinyl caprolactam), starch, cellulose type materials, etc. The optional polymers can also be any water dispersion of less polar polymer such as commercial vinyl acetate homopolymers and copolymers, acrylate homopolymers and copolymers, polyurethanes, etc. The preferred polyurethane is somewhat unique as it will have a high percentage of repeat units from ethylene oxide and will have a high percentage of the ethylene oxide in what we will call tethered poly(alkylene oxide) chains. The amount of ethylene oxide repeat units in this particular microstructure gives the reducible polyurethane unique properties that help it absorb water and organic solvents from the ink, but the polyurethane (due to the tethered nature of the poly(alkylene oxide) does not swell so appreciably that it loses rub resistance. The acrylic copolymer is also somewhat unique as it will have specific amounts of repeat units from acrylic and methacrylic acids and other specific amounts of repeat units from $C_1$ to $C_{12}$ alkyl esters of acrylic and/or methacrylic acid. The repeat units of combined acrylic and methacrylic acid give the acrylic copolymer good (controlled) interaction/absorbency with water and the repeat units from $C_1$ to $C_{12}$ alkyl esters of acrylic or methacrylic acid give the acrylic copolymer sufficient hydrophobicity that it can resist swelling in water to an extent to jeopardize the wet rub resistance of the ink receptive coating.

The amount of the water reducible polyurethane will be about 10 to 90 wt. % of the binder, more preferably from about 40 to 80 wt. % of the binder, more preferably from about 45 to about 75 wt. % of the binder and preferably from about 50 to 70 wt. % of the binder. The amount of the acrylic copolymer of the dispersion will be from about 10 to 90 wt. % of the binder, more desirably from about 20 to 60 wt. %, more desirably from about 25 to about 55 wt. % of the binder, and preferably from about 30 to about 50 wt. % of the binder. An optional polymer(s) may be present up to 10 or 20 wt. % of the binder of the coating. For ease of incorporation, the optional polymers are desirably added as a dispersion or solution in water. The optional polymers may be anionic, cationic, zwitterionic, or nonionically dispersed if added as dispersions in an aqueous media.

The first polymer used in the binder system for the ink receptive coating or film is a water reducible polyurethane. Polyurethanes are well known in the literature and are characterized by multiple urethane linkages from the reaction of polyisocyanate reactants with macromolecular diols called polyols (e.g., with one or more than two isocyanate reactive groups, such as hydroxyl, thiol or amine terminated macromolecules). Polyols are usually considered as being about 500 to about 5,000 or 6,000 g/mole molecules or oligomers. Common polyols used in conventional polyurethanes are polyesters, polyethers, polycarbonates, and other oligomers. Usually polyols used in polyurethanes have two or more groups (such as hydroxyl, amine, or thiol groups) that can react with polyisocyanates to form a polyurethane of significant molecular weight. The molecular weights given here are number average molecular weights based on gel permeation chromatography using tetrahydrofuran as the solvent and polystyrene standards of known molecular weight to calibrate the instrument. Polyurethanes can also use low molecular weight reactants called chain extenders such as ethylene glycol and other glycols with two or more reactive hydroxyl groups and molecular weights below 500 g/mole. While the polyol forms the soft segment of the polyurethane (making them softer) the chain extenders contribute to the hard portion of the urethane.

The water reducible polyurethane is characterized by a high percentage of repeat units of ethylene oxide in the polyurethane and a high percentage of those ethylene oxide units of the polyurethane being in what is referred to as tethered polymer chains extending from the polyurethane backbone. The historical polyurethane backbone includes polyisocyanates (mostly di-isocyanates but optionally mono-isocyanates and tri, tetra, etc. functionality isocyanates) and the macromolecular polyfunctional (also referred to as polyols above, and often difunctional) reactants that form polymer chains between two isocyanate reactants when reacted into the polyurethane network. Desirably, the water reducible polyurethane of this disclosure contains from about 30 to about 80 or 85 wt. % ethylene oxide repeat units, more desirably from about 40 or 50 to 80 or 85 wt. % ethylene oxide repeat units and preferably from about 60, 65 or 70 to about 80 or 85 wt. % ethylene oxide repeat units based on the weight of the reducible polyurethane (less water and solvents of any continuous phase/dispersion media). Desirably from about 50 to about 100 wt. % of said ethylene oxide units, more desirably about 60 to about 100 wt. %, and preferably from about 70, 75, 80, 85 or 90 to about 100 wt. % of said ethylene oxide repeat units in said reducible polyurethane are in tethered chains (optionally laterally attached) based on the total weight of ethylene oxide repeat units in the reducible polyurethane Because a high percentage of the ethylene oxide repeat units are in tethered (optionally laterally attached) poly(alkylene oxide) chains, there are proportionately low amounts of ethylene oxide permitted to be incorporated into the polyurethane backbone, such as from 0 to 10, 15, 20, 25, 30 or 50 wt. % based on the total weight of ethylene oxide repeat units in the reducible polyurethane. We use the term poly(alkylene oxide) tethered chains to allow for some propylene oxide, butylene oxide, or styrene oxide in the chains as co-monomers, but we limit the weight percent to being based on the ethylene oxide as these repeat units are more important to the final property than other oxide repeat units. When we say tethered poly(alkylene oxide) chains, we mean laterally attached and terminally attached chains. When we go to the preferred embodiment of laterally attached poly(alkylene oxide) chains we are excluding terminally attached poly(alkylene oxide) chains if they are attached via a single chemical bond to a terminal isocyanate unit.

Definition of tethered polymer segment: Tethered polymer segments are known in the literature especially for comb polymers where each tooth on the comb polymer is usually considered as a tethered polymer attached to the comb backbone and other polymer microstructures having polymers with free chain ends extending out into another media (such as polymer chain ends). Tethered in the dictionary is defined as where one end of a rope or chain is fastened to a fixed point and the other end of the rope or chain is free to move (i.e., it is not fastened at another point that restricts it movement) such that the free end is free to move anywhere in a circle defined with a center point as the point of attachment and the radius defined as the maximum extension length of the rope or chain from the point of attachment to the center. We want to use the adjective tethered to describe $C_2$-$C_4$ polyether polymer segments (i.e. poly(alkylene oxide) polymer segments derived from polymerizing $C_2$-$C_4$ epoxides) that have one free end (not attached to a polyurethane backbone) and one or more distal point of attachment of the polyether to a polyurethane backbone (the polyurethane backbone being defined as polyurethane polymer itself with urethane connecting groups connecting difunctional and higher functionality macromolecules and chain extenders). In defining tethered, we would consider the end of the polyether attached to the polyurethane backbone via a urethane linkage as the point of attachment or center of the circle. The portion of the polyether having the terminal end non-attached to a polyurethane and all of the polyether (poly(alkylene oxide)) between the end and the closest point of attachment (measured from the non-attached terminus) to a polyurethane would be considered the tethered portion of the poly(alkylene oxide). We have selected the closest point of attachment (measured from the free (non-attached) end of the polymer segment) because in some systems (especially in laterally attached polyether segments) there are two points of attachment of the polyether near one end of the polyether. With the tethered rope or chain, if one end is fastened to two points of attachment, then the tethered portion of the rope or chain is only that portion from the free end of the poly(alkylene oxide) to the closest point of attachment of the free end of the rope or chain to the attachment point (or polyurethane backbone). To facilitate calculating the portion of tethered polyether, we exclude urethane containing linkages from the definition of a tethered poly(alkylene oxide). Thus, if one mole of polyether with two terminal hydroxyl groups is reacted with 1.5 moles of diisocyanate and one mole of mono-hydroxyl terminate polyether (the other end of the polyether being an alkyl group) then provided that there are no unreacted hydroxyl groups, the polyether with two hydroxyl end groups would be considered to be a polyurethane network polyether group (incorporated into the polymer network) and the polyether groups of the poly(alkylene oxide) incorporated into the polymer network would not be considered tethered polyether groups or repeat units. However, the mono-hydroxyl terminated polyether would be considered a tethered polyether group since it could only be attached to the polyurethane at one point (the urethane linkage from the reaction of the hydroxyl terminus with an isocyanate group) and all of the ethylene oxide units of that polyether would be considered as being tethered ethylene oxide repeat units. Similarly, there are commercially available polyethers with two terminal hydroxyl groups near one end of the polyether and a significant portion of the polyether extending in a tethered fashion from those two points of attachment at one end the polyether. These include Tegomer® D3403 used in U.S. Pat. No. 6,897,381 and Ymer™ N-120 from Perstop (used in examples in the current application). For the purposes of our calculation of percent tethered polyether, we will consider the two hydroxyl groups at one end of the chain and any intervening carbon or oxygen groups between the two hydroxyl groups as part of the polyurethane backbone. Only the portion of the polyether extending between the free (non-attached) end of the polyether (such as from Tegomer D3403 or Ymer N-120) to the linkage to the portion of the polyether contained between the two hydroxyl groups will be considered part of the tethered polyether segment.

One might ask why is it relevant or important to distinguish between polyether segments incorporated into a polyurethane network and those tethered to a polyurethane network. These differences are partially explained in U.S. Pat. No. 6,897,281 (to Mssrs. Lubnin, Snow, Varn, and Anderle) wherein polyurethanes with laterally attached polyether segments from Tegomer D3403 oligomer give high moisture vapor permeability and good electrical conductivity. Both of these properties illustrate some sort of co-continuous network of polyether segments in laterally attached chains exist in the polyurethane since the water vapor must pass primarily through the polyether portion of the polymer and the electrical conductance is much greater in the polyether portion. While not wishing to be bound by theory it is believed that in a system as disclosed in U.S. Pat. No. 6,897,281 the tethered (or laterally attached) poly(ethylene oxide) chains are slightly phase separated from the rest of the polyurethane as a co-continuous network. The slightly phase separated continuous polyether phase is constrained from absorbing too much water by the also co-continuous polyurethane phase. Thus the poly(ethylene oxide) polymers and therefore the polyurethanes of U.S. Pat. No. 6,897,281 swell less than nearly equivalent polyurethane systems where equivalent amounts of a di or trihydroxyl terminated poly(ethylene oxide) is incorporated into polyurethane between urethane linkages (as part of the polyurethane load bearing network). The tethered poly(alkylene oxide) chains, since they don't usually form load bearing flexible linkages between two or more urethane segments, aren't usually considered part of the load bearing network of the polyurethane. When the dihydroxyl terminated polyether is incorporated in equivalent wt. amounts into a similar polyurethane higher swelling in water and polar solvents is observed experimentally than with tethered polyethers. This can be seen in some of the very hydrophilic thermoplastic polyurethane disclosed in the prior art such as WO2015/171483 disclosed in the Background of the Invention. Again, while not wishing to be bound by theory, in systems where the polyether is part of the soft load bearing polyurethane network, the polyether is the often a significant portion of the continuous phase and the urethane linkages form a discontinuous phase of physical or chemical crosslinking function. When the soft continuous polyether phase wants to expand and the polyurethane linkages form a smaller dispersed (non-continuous) crosslinking phase, the network can expand by a factor of ten or more because the forces resisting expansion are discontinuous domains and the continuous domain pre-existed as a highly coiled polymer that can expand and lengthen by factors of ten or more when in a compatible solvent.

The polymer network with the polyether as part of the network can be compared to the product of U.S. Pat. No. 6,897,281 (laterally or tether attached polyether where the polyether partially phase separates as a co-continuous phase from the rest of the polyurethane (which is also co-continuous). In this polyurethane system, with the laterally attached or tethered polyethers attached to, but phase separated from the polyurethane phase, one has two co-continuous polymer systems providing properties. The more hydrophobic polyurethane backbone system resists swelling in water. The more hydrophilic tethered polyether segments try to swell in water but are partially constrained by the co-continuous polyurethane backbone phase (which is a co-continuous phase and is not a dispersed phase as formed in the polyurethanes from polyethers with two or more terminal hydroxyl groups general at the opposite termini of the polyether). We believe this explanation is correct and explains why tethered poly(ethylene oxide) segments give good water absorption but does not swell to the excessive extent that similar poly(ethylene oxide) content polyurethanes would if the polyether were part of the homogenous load bearing polyurethane network rather than in a co-continuous phase rich in poly(ethylene oxide).

In one embodiment, the reducible polyurethane can also be described by the hydrophilic-lipophilic balanced as described by Griffin in his 1949 "Classification of Surface-Active Agents by 'HLB'", Journal of the Society of Cosmetic Chemists 1 (5): 311-26. In that article, he calculates the HLB by the formula HLB=20×($M_h$/M) where $M_h$ is the molecular mass of the hydrophilic portion of the molecule and M is the molecular mass of the whole molecule. In our Example A, PEO containing PUD with about 70 wt. % PEO the $M_h$ would be about 437 (514×85% PEO in Ymer) and the M would be about (514+186). So, the HLB would be about 12.5. The limitation of HLB would be desirably about 8-16, more desirably from about 9 to about 15 and preferably from about 10 to about 14 (centered around 12). This HLB limitation could be used in combination with the percent of poly(ethylene oxide) in tethered or laterally attached poly(alkylene oxide) chains.

The water reducible polyurethanes of this invention can be made from polyisocyanates, macromolecular poly(alkylene oxide) components (generally with one or two isocyanate reactive groups (hydroxyl, amine, or thiol) at one end of the poly(alkylene oxide), and optionally chain extenders. One skilled in the polyurethane synthesis will understand how to make these reducible polyurethanes, but we will briefly explain how to make polyurethanes in general and how to make the reducible polyurethanes of the claims with high percentages of tethered (or laterally attached) poly(ethylene oxide) rich chains. As explained above, polyurethanes are generally made by reacting polyisocyanate components with molecules having active hydrogen groups (called isocyanate reactive groups) that can react with isocyanate groups and form urethane or urea linkages. The isocyanate groups also react with water, so generally the reaction of isocyanate groups initially occurs in low water content or water free environments to minimize the amount of side reactions between water and isocyanate groups. For our reducible polyurethanes, we can react the poly(ethylene oxide) rich chains early with the polyisocyanates under favorable conditions. The use of catalysts to promote the reaction between the isocyanate groups and the active hydrogen containing molecules is also possible and will reduce the reaction temperature required and the reaction time required. Generally, the scientist will take an aliquot of the reactants and titrate any residual (non-reacted) isocyanate groups to determine the extent of reaction completed at any given time to control the reaction time and molecular weight of the polyurethane.

If one is preparing laterally attached poly(ethylene oxide) rich polyurethanes the only required essential reactants are the polyisocyanates and the poly(ethylene oxide) macromolecules. This is because there are generally two isocyanate reactive groups on one end of the Tegomer D3403 and the Ymer N-120 and a alkyl group at the other tethered end such that when reacted with a diisocyanate compound at appropriate temperature and reactive group ratios, one creates a linear polyurethane backbone with poly(ethylene oxide) rich chains extending out from the polyurethane backbone in a tethered manner. One usually controls the ratio of isocyanate groups and isocyanate reactive groups (typically keeping the ratio away from 1:1 where molecular weight is highest until the polymer is dispersed or dissolved in a continuous media). After dispersion or dissolving of the polyurethane prepolymer in water, the prepolymer can be chain extended into higher molecular weight polymer until the desired molecular weight is achieved. Usually, the desired number average molecular weight during the initial urethane prepolymer formation is about 10,000 to about 50,000 g/mole, such that the polymer is reasonably liquid at temperatures between 0 and 100° C. and can be added and dispersed or dissolved in water (which is a liquid with a density near 1 g/cc for most purposes between 0 and 100° C.). Other reactants such as chain extenders and difunctional polyols can be added to modify the properties, molecular weight, and branching of the polyurethane, but they dilute the essential components in the polyurethane. Higher functionality reactants such as tri functional and tetra functional isocyanates and chain extenders can be added and reacted into the polyurethane if more branching and higher molecular weights are desired. Water dispersing additives (such as anionic, cationic, nonionic, or blends of the various ionicities).

If one is making the tethered poly(ethylene oxide) rich polyurethane using monofunctional polyether chains (having only a single isocyanate reactive group at one end and a non-isocyanate reactive terminus at the other end) the use of polyfunctional reactants (either an isocyanate with functionality of 3 or more or an isocyanate reactive group with functionality of 3 or more) is almost a necessity. With the monofunctional poly(ethylene oxide) approach one can create isocyanate terminated polyethers first by reacting a di or polyisocyanate with the single isocyanate reactive group on the polyether or one can first create a highly branched polyurethane core by reacting trifunctional components (such as isocyanates or polyols) with difunctional components to create a branched polyurethane core and then react onto the branched core the monofunctional reactive poly(ethylene oxide) rich chains. Usually with either reaction mechanism, the ratio of isocyanate reactive groups and isocyanate groups is controlled so the first number average molecular weight achieved is about 10,000 to about 50,000 g/mole. Normally, these first polymers have some excess isocyanate groups so after dispersing in water or putting in solution in water, the polyurethane chains can be chain extended by adding reactants that are di or polyfunctional and react with isocyanate groups to form urethane or urea linkages. These reactants would be triols, tetrol, diamines, triamines, tetramines etc. Because isocyanate groups are more reactive with amines than with hydroxyl groups, often amine chain extenders are preferred over hydroxyl based chain extenders when chain extending in an aqueous media. Sometimes amine type chain extenders are created by reacting isocyanate groups with water, which generates a molecule of $CO_2$ and an amine terminal group where the nitrogen of the isocyanate group existed earlier. Then, the newly generated amine group can react with any free isocyanate groups to create a urea linkage and build molecular weight of the polyurethane component.

Active Hydrogen-containing Compounds. The term "active hydrogen-containing" refers to compounds that are a source of active hydrogen and that can react with isocyanate groups via the following reaction: —NCO+H—X→—NH—C(=O)—X. Examples of suitable active hydrogen-containing compounds include but are not limited to polyols, polythiols and polyamines.

U.S. Pat. No. 6,897,281 discloses water reducible polyurethane compositions that would function in some embodiments in the current application. It focuses on laterally attached poly(ethylene oxide) chains meeting our definition of tethered poly(ethylene oxide) chains under some conditions.

US publication 2010/0267299 discloses another polyurethane composition that would function in some embodiments of the current invention. That polyurethane composition is disclosed in that document in Table II examples P-11 (063, 116, 119, and 120) and is tested in Tables VIII, IX, and X in combination with PVC in a film.

Additional embodiments for processes for making the hydrophilic polyurethane include making similar prepolymers or chain extended polyurethane using ethylene oxide polymers that are monoalkoxy and monohydroxy terminated or if the stoichiometry of the reaction groups is controlled to prevent chain extension the isocyanate groups can be reacted with di or polyhydroxy polymers and thereby be terminated. Using monohydroxyl terminated or polyhydroxyl terminated polymers are less likely to result in side chain poly(ethylene oxide) but do result in hydrophilic polyurethanes that promote moisture vapor transmission. In one embodiment, it is preferred to use relatively small amounts of urethane forming components (di and poly-isocyanates and optionally in-chain polyols and amines) to create a polyfunctional isocyanate functionalized polymer core that can be capped with several mono-hydroxyl functionalized poly(ethylene oxide) segments. In another embodiment, a tri or higher functionality isocyanate could be directly reacted with several hydroxyl or amine terminated oligomers containing poly(ethylene oxide) segments. The hydroxyl or amine terminated oligomers could contain other repeating units, such as propylene oxide, or could comprise mostly ethylene oxide repeating units. The hydroxyl or amine terminated oligomers could be alkoxy capped if chain extension or chain coupling reactions were to be avoided. These would create a relatively low molecular weight hydrophilic urethane prepolymers that could be used as the hydrophilic polymer.

U.S. Pat. No. 8,664,331 discloses in column 3 line 56 through column 8, line 6 alternative poly(ethylene oxide) rich polymers (alternatives to Tegomer D3403 and Ymer N-120) that can generate laterally attached (or tethered) polyethylene oxide rich segments in a reducible polyurethane. U.S. Pat. No. 8,664,331 teaches how to make polyurethane dispersants with laterally attached polyether chains. These formulations could be slightly modified to create the reducible polyurethane of the current invention. In one embodiment, it may be desirable to increase the molecular weight of the dispersants of this reference such that reduced swelling in water will result. Typically, dispersants of the type in this patent are under 100,000 g/mole molecular weight. One skilled in the art could easily adapt the teachings of this reference to chain extend or otherwise increase the molecular weight of the dispersants.

Catalysts. The formation of the isocyanate-terminated prepolymer may be achieved without the use of a catalyst. However, a catalyst is preferred in some instances. Examples of suitable catalysts include stannous octoate, dibutyl tin dilaurate, and tertiary amine compounds such as triethylamine and bis-(dimethylaminoethyl)ether, morpholine compounds such as β,β'-dimorpholinodiethyl ether, bismuth carboxylates, zinc bismuth carboxylates, iron(III) chloride, potassium octoate, potassium acetate, and DABCO® (diazabicyclo[2.2.2]octane), from Air Products. The preferred catalyst is a mixture of 2-ethylhexanoic acid and stannous octoate, e.g., FASCAT® 2003 from Elf Atochem North America. The amount of catalyst used is typically from about 5 to about 200 parts per million of the total weight of prepolymer reactants.

Chain Extenders. As a chain extender, at least one of water, inorganic or organic polyamine having an average of about 2 or more primary and/or secondary amine groups, polyalcohols, ureas, or combinations thereof is suitable for use in the present invention. Suitable organic amines for use as a chain extender include diethylene triamine (DETA), ethylene diamine (EDA), meta-xylylenediamine (MXDA), aminoethyl ethanolamine (AEEA), 2-methyl pentane diamine, and the like, and mixtures thereof. Also suitable for practice in the present invention are propylene diamine, butylene diamine, hexamethylene diamine, cyclohexylene diamine, phenylene diamine, tolylene diamine, 3,3-dichlorobenzidene, 4,4'-methylene-his-(2-chloroaniline), 3,3-dichloro-4,4-diamino diphenylmethane, sulfonated primary and/or secondary amines, and the like, and mixtures thereof. Suitable inorganic amines include hydrazine, substituted hydrazines, and hydrazine reaction products, and the like, and mixtures thereof. Suitable polyalcohols include those having from 2 to 12 carbon atoms, preferably from 2 to 8 carbon atoms, such as ethylene glycol, diethylene glycol, neopentyl glycol, butanediols, hexanediol, and the like, and mixtures thereof. Suitable ureas include urea and its derivatives, and the like, and mixtures thereof. Hydrazine is preferred and is most preferably used as a solution in water. The amount of chain extender typically ranges from about 0.5 to about 0.95 equivalents based on available isocyanate.

Polymer Branching. A degree of branching of the polyurethane may be beneficial, but is not required. This degree of branching may be accomplished during the prepolymer step or the optional chain extension step. For branching during the optional chain extension step, the chain extender DETA is preferred, but other amines having an average of about two or more primary and/or secondary amine groups may also be used. For branching during the prepolymer step, it is preferred that trimethylol propane (TMP) and other polyols having an average of about two or more hydroxyl groups be used. The branching monomers can be present in amounts up to about 5 wt % of the polymer backbone.

Polyisocyanates

Suitable polyisocyanates have an average of about two or more isocyanate groups, preferably an average of about two to about four isocyanate groups and include aliphatic, cycloaliphatic, araliphatic, and aromatic polyisocyanates, used alone or in mixtures of two or more. Diisocyanates are more preferred.

Specific examples of suitable aliphatic polyisocyanates include alpha, omega-alkylene diisocyanates having from 5 to 20 carbon atoms, such as hexamethylene-1,6-diisocyanate, 1,12-dodecane diisocyanate, 2,2,4-trimethyl-hexamethylene diisocyanate, 2,4,4-trimethyl-hexamethylene diisocyanate, 2-methyl-1,5-pentamethylene diisocyanate, and the like. Polyisocyanates having fewer than 5 carbon atoms can be used but are less preferred because of their high volatility and toxicity. Preferred aliphatic polyisocyanates include hexamethylene-1,6-diisocyanate, 2,2,4-trimethyl-hexamethylene-diisocyanate, and 2,4,4-trimethyl-hexamethylene diisocyanate.

Specific examples of suitable cycloaliphatic polyisocyanates include dicyclohexylmethane diisocyanate, (commercially available as Desmodur™ W from Bayer Corporation), isophorone diisocyanate, 1,4-cyclohexane diisocyanate, 1,3-bis-(i socyanatomethyl) cyclohexane, and the like. Preferred cycloaliphatic polyisocyanates include dicyclohexylmethane diisocyanate and isophorone diisocyanate.

Specific examples of suitable araliphatic polyisocyanates include m-tetramethyl xylylene diisocyanate, p-tetramethyl xylylene diisocyanate, 1,4-xylylene diisocyanate, 1,3-xylylene diisocyanate, and the like. A preferred araliphatic polyisocyanate is tetramethyl xylylene diisocyanate.

Examples of suitable aromatic polyisocyanates include 4,4'-diphenylmethylene diisocyanate), toluene diisocyanate, their isomers, naphthalene diisocyanate, and the like.

If the water reducible polyurethane is being made with the tethered polyalkylene oxide chains as predominantly laterally attached polyalkylene oxide chains then in one embodiment it is desirable to use a prepolymer method to make the reducible polymer prepolymer, disperse or dissolve the prepolymer in an aqueous media and then chain extend the prepolymer to a slightly higher molecular weight. If one made the reducible polyurethane via the prepolymer method the NCO to active hydrogen ratio is as set forth for prepolymers several paragraphs below. If one uses the technology of U.S. Pat. No. 6,897,281 for polyurethanes that can function as dispersants, the NCO:active hydrogen ratio could be as set forth below, or since there may be no need to chain extend, the NCO:active hydrogen ratio could be closer to 1:1 as set forth in that patent. If one makes the reducible polyurethane with high amounts of branching in the polyurethane and many of the polyalkylene oxide in tethered polyalkylene oxide chains of the terminal position on polyurethane chain ends, then the NCO:active hydrogen ratio could be different from below and would depend on whether a highly branched polyurethane backbone is first made and then functionalized with terminal poly(ethylene oxide) type chains or if the monofunctional poly(ethylene oxide) type chains are first reacted with polyisocyanates and then that reaction product is coupled into highly branched polyurethane molecules.

As used herein, the term "alkylene oxide" includes both alkylene oxides and substituted alkylene oxides having 2 to 10 carbon atoms per alkylene unit. The active hydrogen-containing compounds can comprise alkylene oxide and substituted alkylene oxide units having from 3 to about 10 carbon atoms per alkylene unit, such as propylene oxide, tetramethylene oxide, butylene oxides, epichlorohydrin, epibromohydrin, allyl glycidyl ether, styrene oxide, and the like, and mixtures thereof Prepolymer Ratios of Isocyanate to Active Hydrogen. The ratio of isocyanate to active hydrogen in the prepolymer typically are centered around 1.5 and ranges from about 1.1/1 to about 2.5/1, preferably from about 1.1/1 to about 1.9/1, and more preferably from about 1.3/1 to about 1.7/1.

Compounds Having at Least One Crosslinkable Functional Group. Compounds having at least one crosslinkable functional group include those having carboxylic, carbonyl, amine, hydroxyl, and hydrazide groups, and the like, and mixtures of such groups. The typical amount of such optional compound is up to about 1 milliequivalent per gram of final polyurethane, preferably from about 0.05 to about 0.5 milliequivalent, and more preferably from about 0.1 to about 0.3 milliequivalent per gram of final polyurethane on a dry weight basis.

The preferred monomers for incorporation into the isocyanate-terminated prepolymer to improve water dispersibility are hydroxyl-carboxylic acids having the general formula (HO)xQ(COOH)y, wherein Q is a straight or branched hydrocarbon radical having 1 to 12 carbon atoms, and x and y are 1 to 3. Examples of such hydroxy-carboxylic acids include citric acid, dimethylolpropanoic acid (DMPA), dimethylol butanoic acid (DMBA), glycolic acid, lactic acid, malic acid, dihydroxymalic acid, tartaric acid, hydroxypivalic acid, and the like, and mixtures thereof. Dihydroxy-carboxylic acids are more preferred with dimethylolpropanoic acid (DMPA) being most preferred.

Other suitable compounds providing crosslinkability include thioglycolic acid, 2,6-dihydroxybenzoic acid, and the like, and mixtures thereof.

Prepolymer Neutralization

Optional neutralization of the prepolymer having pendant carboxyl groups converts the carboxyl groups to carboxylate anions, thus having a water-dispersibility enhancing effect. Suitable neutralizing agents include tertiary amines, metal hydroxides, ammonium hydroxide, phosphines, and other agents well known to those skilled in the art. Tertiary amines and ammonium hydroxide are preferred, such as triethyl amine (TEA), dimethyl ethanolamine (DMEA), N-methyl morpholine, and the like, and mixtures thereof. It is recognized that primary or secondary amines may be used in place of tertiary amines, if they are sufficiently hindered to avoid interfering with the chain extension process.

Other additives for preparation of water reducible polyurethane include defoamer, biocide, catalyst, solvents, coalescents, plasticizers, surface tension modifiers, antioxidants, and stabilizers.

The acrylic copolymer is desirably used in an amount such that it is from about 10 to 90 wt. % of the binder of the media, more desirably from about 20 to about 60 wt. %, more desirably from about 25 to about 55 wt. % of the binder, and preferably from about 30 to about 50 wt. % of the binder on a dry basis. Desirably the repeat units from the combined acrylic and methacrylic acid monomers are from about 15 or 25 to about 75 wt. % of the acrylic copolymer, more desirably from about 50 to about 70 wt. % and preferably from about 55 to 65 wt. % of the acrylic copolymer. In one embodiment, it is desirable that at least 50, 60, 70, 80 or 90 wt. % of the repeat units from combined acrylic and methacrylic acids are methacrylic acid. Desirably the repeat units from the combined $C_1$-$C_{12}$ alkyl esters of acrylic and methacrylic acid are from about 25 to 75 or 85 wt. % of the acrylic copolymer, more desirably from about 30 to about 50 wt. % and preferably from about 35 to about 45 wt. % of the acrylic copolymer. In one embodiment, at least 50, 60, 70, 80 or 90 wt. % of the repeat units from $C_1$-$C_{12}$ alkyl esters of acrylic and methacrylic acid are esters of $C_3$-$C_8$ alkyl esters of acrylic and methacrylic acid. In another embodiment or combined embodiment, at least 50, 60, 70, 80 or 90 wt. % of the repeat units from $C_1$-$C_{12}$ alkyl esters of acrylic and methacrylic acid are butyl esters of acrylic and methacrylic acid. In another embodiment or combined embodiment, at least 50, 60, 70, 80 or 90 wt. % of the repeat units from $C_1$-$C_{12}$ alkyl esters of acrylic and methacrylic acid are $C_3$-$C_8$ alkyl esters or butyl esters of methacrylic acid. Up to 0, 5, 12 or 25 wt. % of the acrylic copolymer can be repeat units from other free radically polymerizable co-monomers set forth later in this specification The acrylic copolymer of this disclosure can be polymerized with almost any method of polymerization as the composition of the acrylic copolymer and successful blending with the water reducible polyurethane are the more important aspects than the actual polymerization method of the acrylic copolymer. In the examples, the acrylic copolymer was made by emulsion polymerization. The acrylic copolymer could be made by any operable cationic, anionic, or free radical process. If a free radical process was used the process could be emulsion, solution, dispersion, or bulk polymerization. The acrylic copolymer could be produced by living polymerization processes. The acrylic copolymer and the reducible polyurethane seem to be very compatible and help colloidally stabilize each other in an aqueous media. Since the reducible polyurethane is highly non-ionically stabilized, the acrylic copolymer could be stabilized anionically, cationically, and/or nonionically in its aqueous dispersion.

Additional Free-Radical Polymerizable Monomers that can be used in lesser amounts in the acrylic copolymer. Examples of free radically polymerizable monomers which are useful in forming the acrylic copolymer of this invention include vinyl carboxylic monomers other than the required acrylic or methacrylic acid, and acrylic methacrylic acid esters other than the $C_1$-$C_{12}$ required esters. Free radically polymerizable monomers also include unsaturated nitriles, styrenic monomers, vinyl esters, vinyl ethers, conjugated dienes, olefins, halogenated, allyl and other monomers, and mixtures thereof Specific examples include acrylic esters and methacrylic acid esters outside the definition of the methacrylic acid and $C_1$-$C_{12}$ alkyl esters of (meth)acrylic acid listed as main components in the acrylic copolymer having the formula $H_2C=C(R_1)-C(=O)-O-R_2$ wherein $R_1$ is hydrogen or a methyl group, and $R_2$ contains about 1 to 100 carbon atoms, more typically 1 to 50 or 1 to 25 carbon atoms, and optionally, also one or more sulfur, nitrogen, phosphorus, silicon, halogen or oxygen atoms. Examples of suitable (meth)acrylate esters include 2-hydroxyethyl(meth)acrylate, 2-hydroxypropyl(meth)acrylate, 4-hydroxybutyl(meth)acrylate, N,N-dimethylaminoethyl(meth)acrylate, N,N-diethylaminoethyl(meth)acrylate, t-butylaminoethyl(meth)acrylate, 2-sulfoethyl(meth)acrylate, trifluoroethyl(meth)acrylate, glycidyl(meth)acrylate, benzyl(meth)acrylate, allyl (meth)acrylate, 2-n-butoxyethyl(meth)acrylate, 2-chloroethyl(meth)acrylate, cinnamyl(meth)acrylate, crotyl (meth)acrylate, 2-ethoxyethyl(meth)acrylate, furfuryl(meth)acrylate, hexafluoroisopropyl(meth)acrylate, methallyl (meth)acrylate, 3-methoxybutyl(meth)acrylate, 2-methoxybutyl(meth)acrylate, 2-nitro-2-methylpropyl (meth)acrylate, 2-phenoxyethyl(meth)acrylate, 2-phenylethyl (meth)acrylate, phenyl(meth)acrylate, propargyl (meth)acrylate, tetrahydrofurfuryl(meth)acrylate, norbornyl (meth)acrylate, acrylamide and its derivatives, and tetrahydropyranyl(meth)acrylate. Mixtures of acrylic and methacrylic acid esters may be used. The additional polymerized acrylic and methacrylic acid esters (other than the main components of the acrylic copolymer) typically may comprise no more than about 10 or 20 wt. % of the acrylic copolymer.

Unsaturated nitrile monomers include acrylonitrile or an alkyl derivative thereof, the alkyl preferably having from 1 to 4 carbon atoms, such as acrylonitrile, methacrylonitrile, and the like. Also suitable are unsaturated monomers containing a cyano group such as those having the formula $CH_2=C(R)CO(O)CH_2CH_2CN$ $C_3$-$C_8$ wherein R is H or $C_nH_{2n+1}$ and n is 1 to 4 carbon atoms. Other examples of unsaturated nitrile monomers include $CH_2=C(CN)_2$, $CH_3-CH=CH-CN$, $NC-CH=CH-CN$, 4-pentenenitrile, 3-methyl-4-pentenenitrile, 5-hexenenitrile, 4-vinylbenzonitrile, 4-allyl-benzonitrile, 4-vinyl-cyclohexanecarbonitrile, 4-cyanocyclohexene, and the like. Mixtures of the unsaturated nitriles may also be used. Acrylonitrile and methacrylonitrile are preferred. The polymerized unsaturated nitrile monomers typically may comprise no more than about 10 or 20 wt. %, and more typically no more than about 5 wt. % or 3 wt. % of the acrylic copolymer.

The "styrenic monomers" useful in preparing the hydrophilic polymer(s) of this invention may be defined as monomers containing a carbon-carbon double bond in the alpha-position to an aromatic ring. Examples of suitable styrenic monomers include styrene, alpha-methylstyrene, tertiary butylstyrene, ortho, meta, and para-methylstyrene, ortho-, meta- and para-ethylstyrene, o-methyl-p-isopropylstyrene, p-chlorostyrene, p-bromostyrene, o,p-dichlorostyrene, o,p-dibromostyrene, ortho-, meta- and para-methoxystyrene, indene and its derivatives, vinylnaphthalene, diverse vinyl (alkyl-naphthalenes) and vinyl(halonaphthalenes) and mixtures thereof, acenaphthylene, diphenylethylene, and vinyl anthracene. Mixtures of styrenic monomers also may be used. Styrene and alpha-methylstyrene are preferred. The polymerized styrenic monomers typically may comprise no more than about 10 or 20 wt. %, and more typically no more than about 5 wt. % of the acrylic copolymer.

Vinyl ester monomers derived from carboxylic acids containing 1 to 100, more typically 1 to 50 or 1 to 25, carbon atoms also may be useful in preparing the vinyl polymer of the present invention. Examples of such vinyl ester monomers include vinyl acetate, vinyl propionate, vinyl hexanoate, vinyl 2-ethylhexanoate, vinyl octanoate, vinyl pelargonate, vinyl caproate, neo esters of vinyl alcohol, vinyl laurate, and the like, as well as mixtures thereof. The polymerized vinyl ester monomers typically may comprise from 0 wt. % to about 10 or 20 wt. % of the acrylic copolymer of the present invention.

Vinyl ethers may be useful in preparing the vinyl polymer of the present invention. Examples of vinyl ethers include methyl-, ethyl-, butyl, iso-butyl vinyl ethers and the like. The polymerized vinyl ether monomers typically may comprise from 0 wt. % to about 10 or 20 wt. % of the acrylic copolymer of the present invention.

Conjugated diene monomers containing 4 to 12 carbon atoms, and preferably from 4 to 6 carbon atoms, also may be useful in preparing the acrylic copolymer of the present invention. Examples of such conjugated diene monomers include butadiene, isoprene, pentadiene, and like, as well as mixtures thereof.

Fluorine, chlorine, bromine, and iodine-containing monomers also may be useful in preparing the acrylic copolymer of the present invention. They may contain 2 to 100 carbon atoms and at least one halogen atom. Examples of such monomers include vinyl fluoride, vinyl chloride, vinyl bromide, vinylidene fluoride, vinylidene chloride, halogenated (meth)acrylic and styrenic monomers, allyl chloride and like, as well as mixtures thereof Polar and Hydrophilic Monomers. Another group of monomers which are useful in preparing the acrylic copolymer of the present invention are polar monomers such as hydroxyalkyl(meth)acrylates, (meth)acrylamides and substituted (meth)acrylamides, sodium styrene sulfonate and sodium vinyl sulfonate, N-vinyl-2-pyrrolidone, N-vinyl caprolactam, 2-hydroxyethyl(meth)acrylate, 2-hydroxypropyl(meth)acrylate, 4-hydroxybutyl(meth)acrylate, (4-hydroxymethylcyclohexyl)-methyl(meth)acrylate, acrolein, diacetone (meth)acrylamide, 1-(2-((2-hydroxy-3-(2-propenyloxy)propyl)amino)ethyl)-2-imidazolidinone, N-methylol (meth)acrylamide, diallyl phosphate, Sipomer® WAM, WAM II (from Rhodia) and other urido-containing monomers, dimethylaminoethyl(meth)acrylate, and dimethylaminopropyl(meth)acrylamide, crotonic acid, maleic acid, itaconic acid, citraconic acid, maleic anhydride, itaconic anhydride, citraconic anhydride, acrylamido(2-methyl propane sulfonic acid), and vinyl phosphonic acid. Mixtures of polar monomers also may be used.

Hydrophilic Monomers and Components. Hydrophilic components (i.e., monomers, chain transfer agents, initiators) have at least one hydrophilic, ionic or potentially ionic group is optionally included in the acrylic copolymer to assist dispersion of the acrylic polymer, thereby enhancing the stability of the dispersions so made. Typically, this is done by incorporating a compound hearing at least one hydrophilic group or a group that can be made hydrophilic (e.g., by chemical modifications such as neutralization or deblocking) into the acrylic copolymer chain. These compounds may be of a nonionic, anionic, cationic or zwitterionic nature or the combination thereof For example, anionic groups such as carboxylate, sulfate, sulfonate, phosphate, and phosphonate can be incorporated into the polymer in an inactive form and subsequently activated by a salt-forming compound, such as ammonia, organic amines and alkali metal hydroxides. Other hydrophilic compounds can also be reacted into the acrylic copolymer backbone, including lateral or terminal hydrophilic ethylene oxide, the organic amines and polyamine/polyimines previously described as chain extenders for polyurethanes, pyrrolidone or ureido units.

Hydrophilic compounds of particular interest are those which can incorporate acid groups into the polymer such as ethylenically unsaturated monomers having at least one carboxylic acid group, and preferably one or two carboxylic acid groups. Examples of such monomers include itaconic acid, maleic acid, maleic anhydride, fumaric acid, crotonic acid, vinyl acetic acid, mesaconic acid, citraconic acid, 2-acrylamido-2-methylpropanesulfonic acid, styrene sulfonic acid, 2-sulfoethyl(meth)acrylate, alkali metal salts of the above acids and amine or ammonium salts thereof such as sodium allyl sulfonate, sodium 1-allyloxy-2-hydroxypropane sulfonate (COPS 1), 2-acrylamido-2-methyl propane sulfonate (AMPS), sodium dodecyl allyl sulfosuccinate (TREM-LF40), sodium methallyl sulfonate, sodium styrene sulfonate, sodium vinyl sulfonate, sodium vinyl phosphonate, sodium sulfoethyl methacrylate. The polymerized ethylenically unsaturated monomers having at least one acid group other than acrylic and methacrylic acid typically may comprise no more than about 10 wt. %, 9 wt. %, 8 wt. % or even 5 wt. % (and in one embodiment are less than 1 wt. %) of the acrylic copolymer of the present invention. When used, they are normally present in amounts of about 1 wt. % or more, more typically about 2 wt. %, 3 wt. %, 4 wt. %, 5 wt. % 6 wt. %, 7 wt. %, 8 wt. %, 9 wt. % or 10 wt. % or more. The acid-containing monomer and polymers can be esterified with poly(ethylene oxide) containing segments to produce side-chains and/or amidized with amine terminated PEO containing chains.

PEO-Containing Compounds. Another preferred group of hydrophilic compounds are the reactive macromers of alkylene oxides having at least one functional group capable of free-radical transformation. Such macromers, which are well known in the prior art, have the formula X—(Y—O)$_n$—Z wherein Y is a straight or branched chain alkyl radical having 1 to 6 carbon atoms, preferably 2 to 4 carbon atoms, X is a functional group capable of free-radical transformation, such as acrylate, which may be represented by the formula $H_2C=CHC(O)O$—, methacrylate, which may be represented by the formula $H_2C=C(CH_3)C(O)O$—, allyl ether, which may be represented by the formula $H_2C=CHCH_2O$—, vinyl ether, which may be represented by the formula $H_2C=CHO$—, vinylbenzyl, vinylsulfonic ester, which may be represented by the formula $H_2C=CHSO_3$—, or mercaptan, Z is H, $C_mH_{2m+1}$, phosphate, or the same as X, and m is 1 to 8, preferably 1 to 3. "n" may vary to achieve the desired molecular weight (number average) set forth below. Z is preferably H or methyl. X is preferably acrylate or methacrylate. Examples of suitable reactive monomers include methoxy poly(ethylene oxide)(meth)acrylate (also known as methoxypolyethylene glycol methacrylate or "MePEGMA"), methoxy poly(ethylene oxide)allyl ether, poly(ethylene oxide)allyl ether, butoxy poly(ethylene oxide)(meth)acrylate, p-vinylbenzyl terminated poly(ethylene oxide), poly(ethylene oxide)di(meth)acrylate, poly(ethylene oxide)thiol, poly(ethylene oxide)maleimide, poly(ethylene oxide)vinylsulfone, ethyl triglycol methacrylate, and the like. Mixtures of the reactive macromers may also be used. Preferred reactive macromers include methoxy poly(ethylene oxide)(meth)acrylate, methoxy poly(ethylene oxide)allyl ether, and poly(ethylene oxide)allyl ether. Suitable reactive macromers may have molecular weights (number average) from about 100 to about 10,000, preferably from about 100 to about 5,000, and more preferably from about 300 to about 2,000. One such polymeric additive is Bisomer™ S10W from Clariant shown in the examples, which is co-polymerizable source of nonionic polymers. Other similar side-chain monomers include Bisomer MPEG350MA=methoxy(polyethyleneglycol) methacrylate, Bisomer MPEG550MA=methoxy (polyethyleneglycol)methacrylate, Bisomer S10W=methoxy(polyethyleneglycol)methacrylate (50% in water), Bisomer S20W=methoxy(polyethyleneglycol)methacrylate (50% in water), Genagen M 750, Genagen M 1100, and Genagen M 2000; all available from Clariant.

The alkylene oxide-containing macromers typically may comprise no more than about 5 wt. %, 10 wt. %, 15 wt. %, or 20 wt. % of the acrylic copolymer. Hydrophilic poly (ethylene oxide) segments may also be added to the acrylic copolymer by post polymerization reactions between carboxylic groups such as derived from methacrylic acid, epoxy groups such as from glycidyl methacrylate, and/or carboxylic groups from maleic anhydride reacted with hydroxyl and/or amine groups on a poly(ethylene oxide) segment. Such reactions are taught in U.S. Pat. Nos. 5,393,343; 5,583,183; and 5,633,298.

Hydrophilic or potentially hydrophilic groups may also be introduced into the polymer by the use of chain transfer agents such as 3-mercaptopropanoic acid, PEG thiols and like and mixtures thereof.

Compounds Having at Least One Crosslinkable Functional Group. Compounds having at least one crosslinkable functional group can also be incorporated into the acrylic copolymer of the present invention, if desired. Examples of such compounds include N-methylol acrylamide (NMA), diacetone acrylamide (DAAM), acetoacetoxy ethyl methacrylate (AAEM), epoxy-containing compounds, —OH containing compounds, —COOH containing compounds, isocyanate-containing compounds (TMI), mercaptan-containing compounds, compounds containing olefinic unsaturation and the like. Mixtures can also be used.

The composition of the water reducible polyurethane and the acrylic copolymer useful as a binder/film in the ink receptive coating or film of this disclosure can be produced by polymerizing the reducible polyurethane first and then making the acrylic copolymer (via polymerization of the monomers) in the presence of the polyurethane which can result in a composite or hybrid particles. Alternatively one could disperse the reducible polyurethane in an aqueous acrylic copolymer dispersion. These are alternatives to blending the pre-made reducible polyurethane and the pre-made aqueous acrylic copolymer dispersion.

Catalysts. Any compound capable of generating free radicals under the reaction conditions employed can be used as catalysts for vinyl polymer formation in this invention. In this regard, see, "Initiators," Vol. 13, pp. 355-373, Kirk-Othmer, Encyclopedia of Chemical Technology, ©1981, John Wiley & Sons, New York, the disclosure of which is incorporated herein by reference. Anionic, cationic and coordination polymerization catalysts as well as various energy sources such as UV, EB, IR, X-ray can also be used.

Solution or Bulk Polymerization. Techniques for bulk polymerizing and solution polymerizing ethylenically unsaturated monomers are well known in the prior art and described, for example, in the above-noted Kirk-Othmer articles. See also, "Initiators," Vol. 13, pp. 355-373, Kirk-Othmer, Encyclopedia of Chemical Technology, ©1981, John Wiley & Sons, New York, the disclosures of which is also incorporated herein by reference. Any such technique can be used in making the vinyl polymers of this invention.

Polymer Neutralization. In those instances, in which the acrylic copolymer includes hydrophilic compounds which produce pendant carboxylic or other acid groups, these groups can be converted to carboxylate or other anions via neutralization. Generally, neutralizing these groups can affect the amount of interaction with water, which means that the more of the copolymer that is neutralized the higher the viscosity of the aqueous acrylic copolymer dispersion for a given polymer concentration in water. In one preferred embodiment, the level of neutralization of the acrylic, methacrylic and other carboxylic acid functional monomers is up to 10, 20, or 30 mole percent of the carboxylic acid groups of those monomers. In one most preferred embodiment, the level of neutralization is zero mole percent as this allows one to use the highest solids loading at a target viscosity value.

Suitable neutralizing agents for this purpose include ammonium hydroxide, metal hydroxides, amines, phosphines, and other agents well known to those skilled in the art. Ammonium hydroxide is preferred. Examples of useful amines include 2-amino-2-methyl-propanol-1 (AMP-95), ethylamine, diethylamine, triethyl amine, ethanolamine, diethanolamine, triethanolamine, dimethyl ethanolamine, N-methyl diethanolamine, methyl amine, dimethylamine, trimethylamine, ethylene diamine, isophorone diamine, N-methyl morpholine, urotropin, DABCO, and the like, and mixtures thereof.

Other additives well known to those skilled in the art can be used to aid in preparation of the binder polymers of this invention. Such additives include surfactants, stabilizers, defoamers, antimicrobial agents, antioxidants, UV absorbers, carbodiimides, and the like. For convenience of application and fast drying times, the binders of this invention typically have total solids of at least about 20 wt. %, preferably at least about 25 wt. % and more preferably at least about 30 wt. % based on the weight of the binder polymers in water.

The benefits of the composition of this disclosure include the possibility of making a very high gloss ink receptive film, such that the printed image on ink receptive film would have a high gloss, if desired. Desirably the gloss (should the user desire high gloss) is from about 20 to about 75, more desirably from about 30 to about 90, and preferably from about 40 to about 90. These gloss measurements are measured at 60 degrees using text method ASTM D523. Alternatively, if the user wanted a lower gloss film or coating, matting agents could be added to the coating or texturing could be applied to the coating or film to introduce matting or lower gloss readings.

The film can also be clear/transparent because it does not require inorganic fillers that tend to reduce the transparency of films. The film can desirably have a transparency of from about 60 to about 100, more desirably from about 80 to about 100 and preferably from about 90 to about 100 when measured by ASTM D1003 on a film of thickness 25 microns. By way of example, the ink receptive coating with high transparency can be applied to a substrate and allows an end user to see through the ink receptive film or media and view or inspect the substrate while having a high resolution print or image applied over the ink receptive film or coating to indicate source, product code, product quality, decorative effect on the substrate. It is also possible with this transparent ink receptive coating/film to print on bottles and other clear containers and allow the end user to see the contents of bottle or container clearly except for the areas of the film/coating that have been made less transparent by an ink image applied to the transparent film/coating. Thus, the transparent ink receptive film/coating allows printing on clear or colored bottles or containers such as beverages, cosmetics, pharmaceuticals, etc. where a consumer might want some information on the outside of the container, but the consumer also wants to view the contents of the container in an unobstructed area.

In one embodiment, the ink receptive coating or film will consist essentially of the water reducible polyurethane polymer and the acrylic copolymer of the aqueous acrylic copolymer dispersion (less the water phase if we are talking about a film or coating). By the term "consisting essentially of," we will mean that the ink receptive coating or film is primarily the two named polymers and other components that will not affect the ink receptivity, gloss value, and drying time of a printed image on the receptive coating or film in a measurable way. Thus, the coating could contain other additives such as biocides, preservatives, humectants, surface modifiers, etc. that do not substantially affect the listed properties. But, the coating or film could not contain highly water interactive polymers or particulates that substantially or measurably affected the gloss, ink receptivity, transparency, or drying time of a printed image on the coating or film.

The ink receptive composition and the film/coating from the ink receptive composition also facilitates binding of an ink image to a substrate beneath the film/coating, prevents unnecessary migration of the wet ink while drying from the intended location to adjacent areas on the film/coating, and facilitates coalescence of the ink to a smudge resistant image/print in a very short time so the printed article can be handled, optionally packaged, and moved away from the print location. The ink receptive composition/film/label achieves this by adsorbing the water and low molecular weight organic materials in the ink into the film/coating, reducing the volume of the continuous phase of the ink, and encouraging coalescence of the binder, pigment and/or dye in the ink into a less liquid more congealed mass that resists smudging. After the ink has dried, the water and low molecular weight organic solvents can slowly evaporate from the ink receptive film/coating.

The ink receptive film or coating can be applied to a substrate or release layer with any known technology for creating films or coatings. These include, rollers, spray, brush, doctor blade, continuous coating or printing equipment, digital printing, etc. The coatings or films can be allowed to air dry or drying can be accelerated by applying heat, air movement, or other known drying processes. The viscosity or rheology of the binder solution can be adjusted to facilitate or allow the desired method of applying the coating material to the substrate or release layer.

The ability to form smudge resistant images or print can be gauged by wet finger rub test after the ink fluid absorbs into the film and/or evaporates. Often, the ink receptive film is characterized by the amount of time it takes a given amount of ink applied to the film to reach the level of drying that it can pass the finger rub test. If the films dry faster, this obviously facilitates preparing the printed articles/objects to be transported from the printing area to a storage or shipping locations without smudging. The finger rub test is subjective as different operators will apply slightly different amounts of pressure with their fingers. The wet finger rub test is subjective as different printers and printer configurations can deposit significantly different amounts of ink per unit surface area of the film and the ink can have different percentages of ink fluids that need to be evaporated to reach the sufficiently dry state to use the finger rub test. Despite these deficiencies, skilled operators can easily and quickly gauge differences between samples with this test.

The compositions and binders of the present application are useful as an ink receptive media (e.g., a coating or film) for a variety of types of printing. The composition can result in high gloss and high transparency of the media from the binders.

The following examples are presented for the purpose of illustrating the invention disclosed and contrasting it with the comparative examples. The examples are not to be construed as limiting the invention herein in any manner, but rather the scope of the invention is to be determined by the appended claims.

EXAMPLES OF THE INVENTION AND COMPARATIVE EXAMPLES

Water Reducible Polyurethane Example A. High PEO-Containing PUD With About 70 wt. % PEO in Tethered Chains and 30 wt. % Isocyanate in the Polyurethane Backbone Used as a Component in Comparative Examples and Inventive Examples Prepolymer Step. A side-chain poly(ethylene oxide) diol (514 grams) having a number-average molecular weight of ~1,000 g/mol (Ymer® N-120 from Perstorp) was mixed with 1.5 equivalents (186 grams) of 1,1'-methylenebis-(4-isocyanato cyclohexane) (Desmodur® W from Bayer Corporation) and reacted at 190-200° F. (88-93° C.) with agitation under a blanket of dry nitrogen for about 90 minutes. The reaction mixture was cooled to 185° F. (85° C.).

Dispersion/solution Step. A portion (200 grams) of the prepolymer was slowly (~5 min) dispersed under rigorous agitation into a mixture containing 0.07 grams Dee Fo PI-40® (defoamer from Ultra Additives), and 800 grams DI water at 68° F. (20° C.). The dispersion/solution was left stirring overnight for water to consume unreacted NCO. Final dispersion had total solids=19.4%, pH 7.7, Brookfield viscosity 30 cP, and a particle diameter size as measured by dynamic light scattering reported at less than 40 nm.

Acrylic Copolymer Example. Acrylic Copolymer Emulsion Polymer Used in Comparative and Inventive Examples To a 3-L four-necked glass flask submerged into a water bath and equipped with a stirrer, reflux condenser, thermometer and nitrogen inlet tube, were added: 866 grams DM water, 3.9 grams sodium lauryl sulfate surfactant (30% in water), and 0.6 gram potassium carbonate. In a nitrogen atmosphere, the temperature of the vessel contents was brought to 84° C., and the initiator solution of 0.25 gram ammonium persulfate in 7 grams DM water was added. Immediately after, the addition of the following monomer pre-emulsion mixture was started over the period of 3 hours: 132 grams DM water, 8 grams sodium salt of alpha-olefin sulfonate, 1.2 grams n-dodecyl mercaptan, 173 grams n-butyl acrylate, and 212 grams methacrylic acid. At the same time, 1.3 grams ammonium persulfate solution in 86 grams DM water started to be gradually added over the period of 3.5 hours. The temperature was maintained at 84° C. After the end of pre-emulsion addition, the temperature was maintained at 84° C. for additional one hour. Then, the contents were cooled to 57° C., and 2.1 grams of the 18% tent-butyl hydroxyperoxide solution in water were added. After 20 minutes of mixing, solution of 0.4 gram erythorbic acid in 14 grams DM water as added. A low-viscosity colloidally stable dispersion was obtained with the following properties: solids content=27.0%, pH=3.8, particle size=72 nm (volume-average, Gaussian distribution, PDI=1.1).

Water Reducible Polyurethane Example C. PEO-Containing PUD Used as a Component in Comparative Examples and Inventive Examples Prepolymer Step. A side-chain poly(ethylene oxide) diol (1,850 grams) having a number-average molecular weight of ~1,000 g/mol (Ymer® N-120 from Perstorp) was mixed with 28 grams of trimethylolpropane, 13 grams of dimethylolpropanoic acid, and 890 grams of 1,1'-methylenebis-(4-isocyanato cyclohexane) (Desmodur® W from Bayer Corporation) and reacted at 190-200° F. (88-93° C.) with agitation under a blanket of dry nitrogen for about three hours. The reaction mixture was cooled to 175° F. (79° C.).

Dispersion/solution Step. A portion (1,580 grams) of the prepolymer was slowly (~7 min) dispersed under rigorous agitation into a mixture containing 1.2 grams Dee Fo PI-40® (defoamer from Ultra Additives), and 4,070 grams DI water at 69° F. (21° C.). The dispersion/solution was left stirring overnight for water to consume unreacted NCO. Final dispersion had total solids=27.5%, pH 7.0, Brookfield viscosity 70 cP, and a particle diameter size as measured by dynamic light scattering reported at less than 40 nm.

Acrylic Copolymer Example D. Acrylic Copolymer Emulsion Polymer Used in Comparative and Inventive Examples To a 5-L four-necked glass flask submerged into a water bath and equipped with a stirrer, reflux condenser, thermometer and nitrogen inlet tube, were added: 1,840 grams DM water, 9.5 grams sodium lauryl sulfate surfactant (30% in water), and 1.4 grams potassium carbonate. In a nitrogen atmosphere, the temperature of the vessel contents was brought to 84° C., and the initiator solution of 0.6 gram ammonium persulfate in 18 grams DM water was added. Immediately after, the addition of the following monomer pre-emulsion mixture was started over the period of 3 hours: 380 grams DM water, 63 grams Abex JKB (Solvay), 3 grams n-dodecyl mercaptan, 380 grams n-butylacrylate, and 570 grams methacrylic acid. At the same time, 3 grams ammonium persulfate and 1.6 grams sodium lauryl sulfate surfactant solution in 430 grams DM water started to be gradually added over the period of 3.5 hours. The temperature was maintained at 84° C. After the end of pre-emulsion addition, the transfer line was flushed with 90 grams DM water, and the temperature was maintained at 84° C. for an additional one hour. Then, the contents were cooled to 57° C., and 5 grams of the 18% tent-butyl hydroxyperoxide solution in water were added. After 20 minutes of mixing, solution of 1 gram erythorbic acid in 34 grams DM water as added. A low-viscosity colloidally stable dispersion was obtained with the following properties: solids content=26.1%, pH=3.2, particle size=75 nm (intensity-average, Gaussian distribution, PDI=1.1).

Inventive Composition Example E. Acrylic Copolymer Emulsion About 53% MMA and About 43 wt. % BA and Water Reducible Polyurethane in Water The coating solution was made up of 19 g of Water Reducible Polyurethane Example A (high PEO content in tethered chains reducible polyurethane), 27 g of Acrylic Copolymer Example B (acrylic copolymer dispersion in water), 0.5 g of dipropylene glycol n-butyl ether (Dowanol® DPnB from Dow) and ethylene glycol monobutyl ether (Eastman™ EB Solvent from Eastman) mixed at 1:1 weight ratio, and 0.3 g of water/isopropanol/trimethylamine mixture at 1:1:2 weight ratio. The formula was prepared by slowly adding the above-mentioned chemicals with mixing in the order listed.

Coating was prepared as lab drawdown on primed polypropylene films using Meyer rod. The coating was cured in a 90° C. oven for 5 minutes to ensure complete drying. The cured coating was printed with Epson Colorwork C831 printer. The printout is pressed by a stack of office paper with a weight of 1 kg immediately after print. Ink drying fastness is evaluated by checking if there is any ink transfer. The printout is then aged under ambient condition for three days, and rubbed using a piece of wet cloth and a 300-gram weight with a 30 mm diameter round contact area. The printing quality is evaluated both visually and by measuring color density.

The coating has good gloss, acceptable ink drying fastness, good wet rub resistance, and good printing quality.

Comparative Composition Example F. Ink Receptive Coating 100% High PEO Content Reducible Polyurethane The coating was prepared by using Water Reducible Polyurethane Example A (polyurethane) "as is" according to the procedure of Example 1564-003-15-122B. The coating was too soft to evaluate printing quality and wet rub resistance.

Comparative Composition Example G. Ink Receptive Coating 100% Acrylic Copolymer

The coating was prepared by using Acrylic Copolymer Example B "as is" and evaluated according to the procedure of Inventive Composition Example E. The coating needed to be handled with great care due to its high stiffness. It had good image quality, good gloss, good wet rub, and poor ink drying fastness.

Comparative Composition Example H with PrintRite™ DP351 (Current General Purpose Ink Receptive Coating)

PrintRite™ DP351 from Lubrizol Advanced Materials was evaluated. The coating had excellent gloss, good printing quality, fair ink drying fastness, and poor wet-rub resistance.

Comparative Composition Example I, DP336 (LZAM's Current Ink Receptive Drum Label Coating with Cationic Silica)

PrintRite™ DP335 from Lubrizol Advanced Materials was evaluated. The coating had excellent printing quality, excellent drying fastness, excellent wet-rub resistance, and gloss lower than 10 gloss unit.

Comparative Composition Example J, With Hydrophilic TPU-Carbopol Films

Three samples prepared by Lubrizol Life Science division A, B and C were tested for printability. These were blends of hydrophilic TPUs with Carbopol. The printed films had low color density and poor wet rub resistance.

Inventive Composition Example K Inventive Example With High PEO Content in Tethered Chains Polyurethane, Acrylic Copolymer Dispersion in Water and Particulate Alumina (60 wt. % Acrylic Copolymer and 40 wt. % Polyurethane)

The coating composition was made up of 25.5 g Water Reducible Polyurethane Example C, 15.0 g Aerodisp 640 ZX alumina from Evonik, and 23.0 g Acrylic Copolymer Example D. The finished coating has good printing quality, good gloss (higher than 80 measured at 60 degrees), good wet rub resistance, and acceptable ink drying fastness.

While certain representative embodiments and details have been shown for the purpose of illustrating the subject invention, it will be apparent, to those skilled in this art that various changes and modifications can be made therein without departing from the scope of the subject invention.

What is claimed is:
1. A dispersion in an aqueous media comprising a) a water reducible polyurethane and b) an aqueous dispersion of acrylic copolymer,
   a water reducible polyurethane being defined as a polymer that is or is not soluble in water at 10 wt. % at 25° C. that exists as a dispersion or solution in water and can be diluted with additional water without going through an obvious change in the state of the dispersion or solution upon dilution with water,
   an aqueous acrylic copolymer dispersion being defined as a copolymer having hydrophobic portions and hydrophilic portions such that it is not soluble in water beyond 5 wt. % at 25° C. but can be made into a dispersion in water at concentrations up to about 60 wt. % polymer wherein colloidal dispersion is defined as having a number average particle diameter between 20 and 500 nanometers based on intensity average gaussian distribution particle size analysis by dynamic light scattering measurements, said a) being 10-90 wt. % of a water reducible polyurethane being characterized as having 30-85 wt. % of polyalkylene oxide segments based on the weight of said polyurethane wherein at least 50 to 100 weight percent of said polyalkylene oxide segments are in tethered poly(alkylene oxide) chains, said b) being 10-90 wt. % of an acrylic copolymer, said acrylic copolymer being in the form of a aqueous dispersion wherein said acrylic polymer being characterized by having about 15 to about 75 wt. % of repeating units from combined acrylic and methacrylic acid and about 25 to 85 wt. % of repeating units combined from $C_1$ to $C_{12}$ alkyl esters of acrylic or methacrylic acid based on the dry weight of the acrylic copolymer, wherein said weight percent of a) and b) is based upon the combined dry weight of the polymer binder solids in a) and b) and any optional polymer in said binder.

2. The dispersion according to claim 1, wherein said a) polyurethane is present from 40 to 80 wt. % and said b) acrylic copolymer is present from 20 to 60 wt. % and wherein optional polymers in said binder are present from 0 to 20 wt. % based on the total dry polymers in said binder.

3. The dispersion according to claim 1, wherein said a) polyurethane is present from 45 to 75 wt. % and said b) acrylic copolymer is present from 25 to 55 wt. %.

4. The dispersion according to claim 1, wherein said a) polyurethane is present from about 50 to 70 wt. % and said b) acrylic copolymer is present from about 30 to 50 wt. %.

5. The dispersion according to claim 1, wherein an aqueous continuous phase is present and said aqueous media comprises at least 80 wt. % water and up to 20 wt. % solvent, based on the weight of the aqueous continuous phase.

6. The dispersion according to claim 1, wherein b) acrylic copolymer comprises from about 50 to 70 wt. % repeating units from combined acrylic and methacrylic acid and from about 30 to 50 combined wt. % of repeating units from $C_1$ to $C_{12}$ alkyl esters of acrylic and methacrylic acid.

7. The dispersion according to claim 1, wherein b) acrylic copolymer comprises from about 55 to 65 wt. % repeating units from combined acrylic and methacrylic acid and from 35 to 45 combined wt. % repeating units from $C_1$ to $C_{12}$ alkyl ester of acrylic and methacrylic acid.

8. The dispersion according to claim 1, wherein at least 50 wt. % of the combined repeat units from acrylic and methacrylic acid are from methacrylic acid and at least 50 wt. % of the repeat units from $C_1$ to $C_{12}$ alkyl ester of acrylic and methacrylic acid are from $C_3$ to $C_8$ alkyl ester of acrylic and methacrylic acid.

9. The dispersion according to claim 1, further comprising a particulate material.

10. A film or coating comprising a blend of a) about 10 to about 90 wt. % of a water reducible polyurethane and b) about 10 to about 90 wt. % of an aqueous dispersion of acrylic copolymer, a water reducible polyurethane being defined as a polymer that is or is not soluble in water at 10 wt. % at 25° C. that exists as a dispersion or solution in water and can be diluted with additional water without going through an obvious change in the state of the dispersion or solution upon dilution with water, an aqueous acrylic copolymer dispersion being defined as a copolymer comprising hydrophobic portions and hydrophilic portions such that it is not soluble in water beyond 5 wt. % at 25° C. but can be made into a dispersion in water at concentrations up to about 60 wt. % polymer wherein the dispersion is defined as having a number average particle diameter between 20 and 500 nanometers as determined by dynamic light scattering measurements using intensity averaging and Gaussian distribution, said a) being 10-90 wt. % of a water reducible polyurethane polymer being characterized as having 30-85 wt. % of polyalkylene oxide segments based on the weight of said polyurethane wherein at least 80 to 100 weight percent of said polyalkylene oxide segments are in tethered poly(alkylene oxide) chains, said b) being 10-90 wt. % of an aqueous acrylic copolymer dispersion said acrylic polymer being characterized by having at about 15 to 75 wt. % of repeating units from combined acrylic and methacrylic acids and about 25 to 85 wt. % of repeating units combined from $C_1$ to $C_{12}$ alkyl esters of acrylic or methacrylic acid, wherein said weight percent of a) and b) is based upon the combined dry weight of the binder solids in a) and b) and any optional additional binder polymer;

said coating or film having a gloss reading of 20 to 95 measured at 60° according to ASTM D523-89.

11. A method of forming an ink receptive coating comprising blending a) a water reducible polyurethane with b) an acrylic copolymer to form a coating compositions, applying to a release layer or a substrate, and drying the coating composition into a film, wherein a) the water reducible polyurethane is present from about 10 to about 90 wt. % of said coating and b) the acrylic copolymer is present from about 10 to about 90 wt. % of said coating based on the weight of all polymers in the binder and wherein b) the water reducible polyurethane comprises from 30 to 80 wt. % repeat units from ethylene oxide, and wherein 50 to 100 wt. % of said repeat units from ethylene oxide are in tethered chains attached to the polyurethane but extending radially from the polyurethane backbone, said b) being 10-90 wt. % of an aqueous acrylic copolymer dispersion said acrylic polymer being characterized by having at about 15 to 75 wt. % of repeating units from combined acrylic and methacrylic acids and about 25 to 85 wt. % of repeating units combined from $C_1$ to $C_{12}$ alkyl esters of acrylic or methacrylic acid, wherein said weight percent of a) and b) is based upon the combined dry weight of the binder solids in a) and b) and any optional additional binder polymer.

12. The method of claim 11, further comprising steps of drying the coating into a film and digitally printing on said film with a water based ink-jet ink to form an image.

* * * * *